United States Patent
Hafner et al.

(10) Patent No.: US 6,415,762 B1
(45) Date of Patent: Jul. 9, 2002

(54) ACCURATE DELIVER OF TOTAL FUEL WHEN TWO INJECTION EVENTS ARE CLOSELY COUPLED

(75) Inventors: Gregory G. Hafner, Normal; Brian G. McGee, Chillicothe, both of IL (US)

(73) Assignee: Caterpillar Inc., Peoria, IL (US)

( * ) Notice: Subject to any disclaimer, the term of this patent is extended or adjusted under 35 U.S.C. 154(b) by 19 days.

(21) Appl. No.: 09/616,004

(22) Filed: Jul. 13, 2000

(51) Int. Cl.⁷ ................................................ F02B 3/00
(52) U.S. Cl. ........................ 123/300; 123/478; 123/496
(58) Field of Search .............................. 123/357, 370, 123/371, 431, 436, 478, 480, 490, 492, 493, 299, 300, 446, 456, 496

(56) References Cited

U.S. PATENT DOCUMENTS

| | | | |
|---|---|---|---|
| 4,545,355 A | * 10/1985 | Takao et al. ................ 123/489 |
| 4,571,683 A | 2/1986 | Kobayashi et al. |
| 4,576,135 A | 3/1986 | Johnson |
| 4,621,599 A | 11/1986 | Igashira et al. |
| 4,704,999 A | 11/1987 | Hashikawa et al. |
| 4,729,056 A | 3/1988 | Edwards et al. |
| 4,836,161 A | 6/1989 | Abthoff et al. |
| 4,922,878 A | 5/1990 | Shinogle et al. |
| 5,020,979 A | 6/1991 | Askew |
| 5,070,836 A | 12/1991 | Wahl et al. |
| 5,113,833 A | 5/1992 | Nagano et al. |
| 5,245,972 A | 9/1993 | Denz et al. |
| 5,267,545 A | 12/1993 | Kitson |
| 5,268,842 A | 12/1993 | Martson et al. |
| 5,277,164 A | 1/1994 | Takahashi et al. |
| 5,320,079 A | 6/1994 | Kuwabara |
| 5,379,733 A | 1/1995 | Haddick et al. |
| 5,402,760 A | * 4/1995 | Takeuchi et al. ............ 123/300 |
| 5,427,072 A | 6/1995 | Udo |
| 5,427,083 A | 6/1995 | Ahern |
| 5,450,829 A | 9/1995 | Beck |
| 5,460,128 A | 10/1995 | Kruse |
| 5,492,098 A | 2/1996 | Hafner et al. |
| 5,499,608 A | 3/1996 | Meister et al. |
| 5,507,260 A | 4/1996 | Hintzen |
| 5,540,205 A | 7/1996 | Davis et al. |
| 5,549,092 A | 8/1996 | Hasegawa et al. |
| 5,566,650 A | 10/1996 | Kruse |
| 5,566,660 A | 10/1996 | Camplin et al. |
| 5,588,415 A | 12/1996 | Ahern |
| 5,609,131 A | 3/1997 | Gray, Jr. et al. |
| 5,615,654 A | * 4/1997 | Weisman, II et al. ....... 123/350 |
| 5,634,448 A | 6/1997 | Shinogle et al. |
| 5,647,317 A | 7/1997 | Weisman, II et al. |
| 5,678,521 A | 10/1997 | Thompson et al. |
| 5,685,273 A | 11/1997 | Johnson et al. |

(List continued on next page.)

FOREIGN PATENT DOCUMENTS

| | | | | |
|---|---|---|---|---|
| EP | 0 221 832 A2 | | 5/1987 | |
| JP | 200932 | * | 7/1999 | ........... F02D/41/38 |

OTHER PUBLICATIONS

SAE Feb. 24–27, 1997 A New Concept for Low Emission Diesel Combusion—Printed from Diesel Engine Combustion Processes and Emission Control Technologies (SP–1246).

*Primary Examiner*—Tony M. Argenbright
*Assistant Examiner*—Hai H. Huynh

(57) ABSTRACT

When two fuel shots such as the main and anchor fuel shots are closely coupled, the controller is operable to determine a total main and anchor fuel quantity, a main shot duration, and anchor delay. The total main and anchor fuel quantity is determined by subtracting a pilot shot fuel amount from the governor fuel output, and a sensor senses a rail pressure. If a triggering condition is met, preferably a main shot fuel amount being less than or equal to a minimum main shot fuel amount, the anchor duration is determined from a map using the main shot duration, anchor delay, rail pressure, and total main and anchor fuel quantity as factors for setting the anchor duration.

25 Claims, 5 Drawing Sheets

U.S. PATENT DOCUMENTS

| | | |
|---|---|---|
| 5,701,870 A | 12/1997 | Gottshall et al. |
| 5,704,336 A | 1/1998 | Wrobel |
| 5,722,373 A | 3/1998 | Paul et al. |
| 5,730,104 A * | 3/1998 | Hafner ............... 123/446 |
| 5,732,680 A | 3/1998 | Ninomiya et al. |
| 5,740,775 A | 4/1998 | Suzuki et al. |
| 5,740,776 A | 4/1998 | Enderle et al. |
| 5,746,183 A | 5/1998 | Parke et al. |
| 5,778,850 A | 7/1998 | Buratti et al. |
| 5,794,585 A | 8/1998 | Yonezawa et al. |
| 5,803,049 A | 9/1998 | Harcombe |
| 5,832,901 A | 11/1998 | Yoshida et al. |
| 5,839,275 A | 11/1998 | Hirota et al. |
| 5,865,153 A | 2/1999 | Matsumoto |
| 5,865,158 A | 2/1999 | Cleveland et al. |
| 5,893,347 A | 4/1999 | McGee et al. |
| 5,924,403 A * | 7/1999 | Thomas ............... 123/300 |
| 5,979,398 A | 11/1999 | Yanagihara |
| 5,979,412 A | 11/1999 | Werner |
| 5,986,871 A | 11/1999 | Forck et al. |
| 6,000,384 A | 12/1999 | Brown et al. |
| 6,006,727 A | 12/1999 | Katashiba et al. |
| 6,009,849 A | 1/2000 | Yamanoto et al. |
| 6,014,956 A | 1/2000 | Cowden et al. |
| 6,021,370 A | 2/2000 | Bellinger et al. |
| 6,026,780 A | 2/2000 | Barnes et al. |
| 6,032,642 A | 3/2000 | Trumbower et al. |
| 6,044,824 A | 4/2000 | Mamiya et al. |
| 6,067,954 A * | 5/2000 | Kudou et al. ............... 123/299 |
| 6,082,331 A * | 7/2000 | Barnes et al. ............... 123/446 |
| 6,085,730 A * | 7/2000 | Coatesworth et al. ....... 123/480 |
| 6,276,610 B1 * | 8/2001 | Spoolstra ............... 239/5 |

\* cited by examiner

Fig. 3.
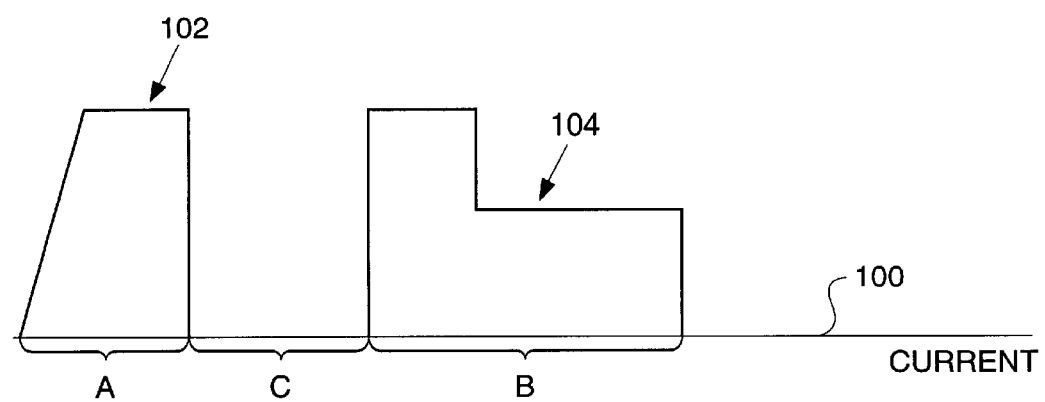
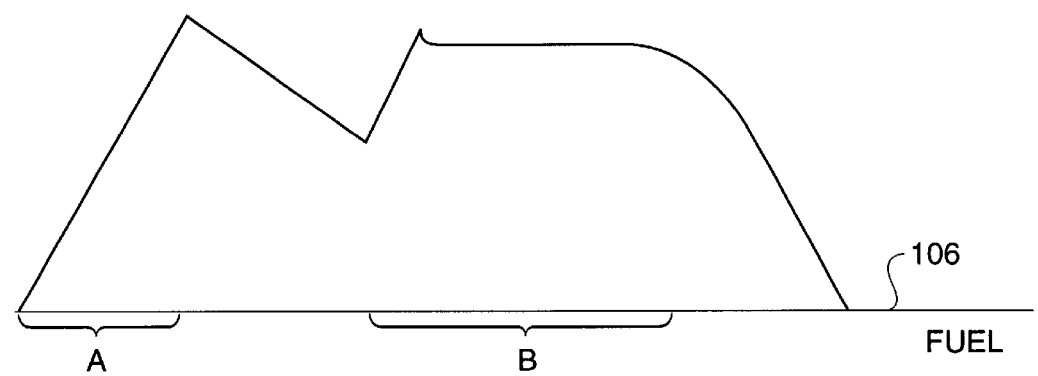

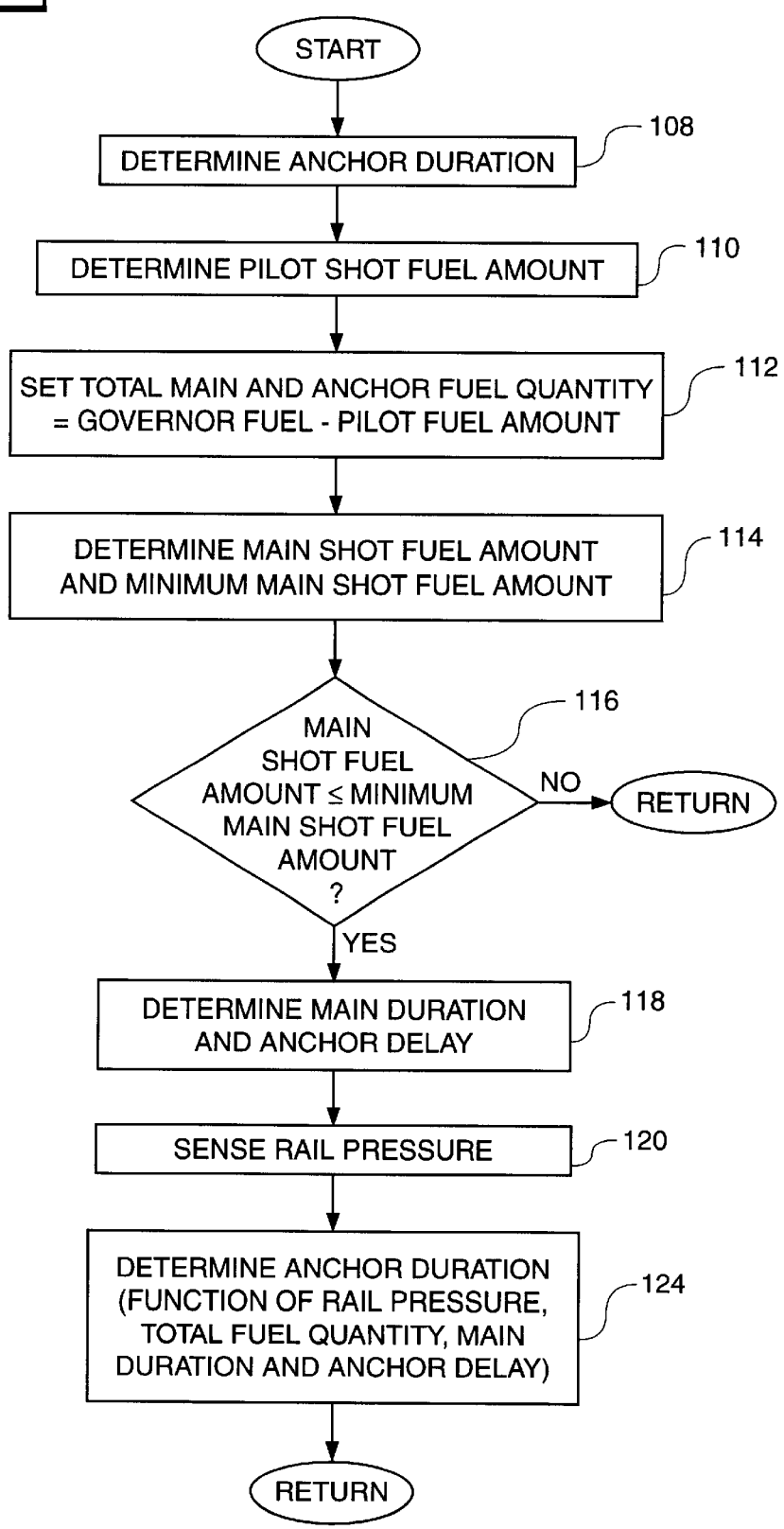

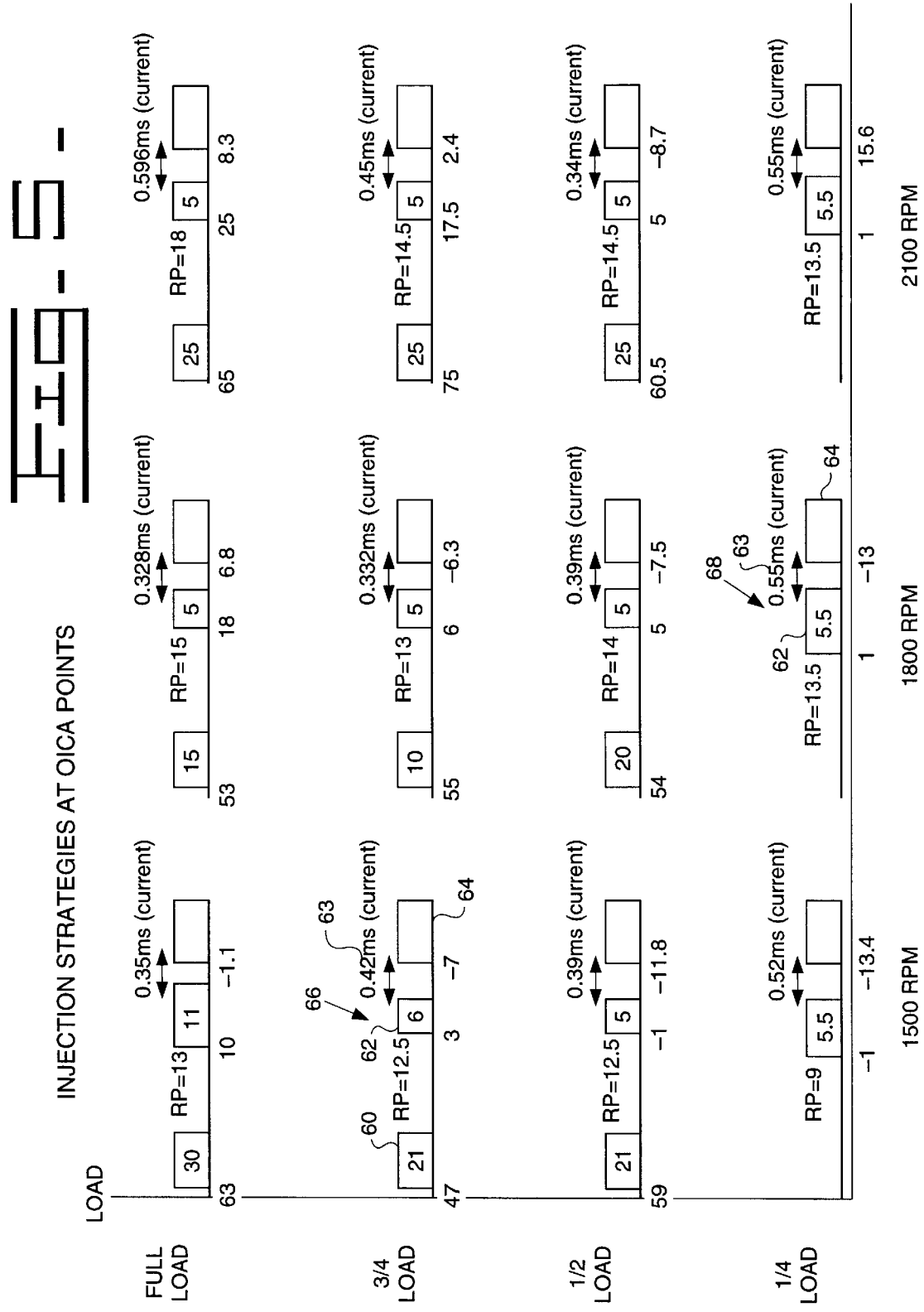

ACCURATE DELIVER OF TOTAL FUEL WHEN TWO INJECTION EVENTS ARE CLOSELY COUPLED

TECHNICAL FIELD

This invention relates generally to electronically controlled fuel injection systems and, more particularly, to a method and apparatus for accurately delivering multiple separate fuel injections to the cylinder of an internal combustion engine during a fuel injection event based upon engine operating conditions when two fuel injection events are separated by a short period of time.

BACKGROUND ART

Electronically controlled fuel injectors are well known in the art including both hydraulically actuated electronically controlled fuel injectors as well as mechanically actuated electronically controlled fuel injectors. Electronically controlled fuel injectors typically inject fuel into a specific engine cylinder as a function of an injection signal received from an electronic controller. These signals include waveforms that are indicative of a desired injection rate as well as the desired timing and quantity of fuel to be injected into the cylinders.

Emission regulations pertaining to engine exhaust emissions are increasingly becoming more restrictive throughout the world including, for example, restrictions on the emission of hydrocarbons, carbon monoxide, the release of particulates, and the release of nitrogen oxides ($NO_x$). Tailoring the number of injections and the injection rate of fuel to a combustion chamber, as well as the quantity and timing of such fuel injections, is one way in which to control emissions and meet such emission standards. As a result, split fuel injection techniques have been utilized to modify the burn characteristics of the combustion process in an attempt to reduce emission and noise levels. Split injection typically involves splitting the total fuel delivery to the cylinder during a particular injection event into two or more separate fuel injections, for example, a pilot injection and a main injection, or a main injection and an anchor injection, which may each be referred to generally as a fuel shot. As used throughout this disclosure, an injection event is defined as the injections that occur in a cylinder during one cycle of the engine. For example, one cycle of a four cycle engine for a particular cylinder, includes an intake, compression, expansion, and exhaust stroke. Therefore, the injection event in a four stroke engine includes the number of injections, or shots, that occur in a cylinder during the four strokes of the piston. The term shot as used in the art may also refer to the actual fuel injection or to the command current signal to a fuel injector or other fuel actuation device indicative of an injection or delivery of fuel to the engine. At different engine operating conditions, it may be necessary to use different injection strategies in order to achieve both desired engine operation and emissions control. In the past, the controllability of split injection has been somewhat restricted by mechanical and other limitations associated with the particular types of injectors utilized. Even with more advanced electronically controlled injectors, during certain engine operating conditions, it is sometimes difficult to accurately control fuel delivery, even when utilizing current control signals.

When dealing with split or multiple fuel injection and the general effects of a boot type fuel delivery and the fuel injection rate shaping which results therefrom, desired engine performance is not always achieved at all engine speeds and engine load conditions. Based upon operating conditions, the injection timing, fuel flow rate and injected fuel volume are desirably optimized in order to achieve minimum emissions and optimum fuel consumption. This is not always achieved in a split injection system due to a variety of reasons, including limitations on the different types of achievable injection rate waveform types, the amount of fuel injected during the pilot shot, when the two injections take place during the particular injection event, the timing sequence between the two injections, and how closely spaced injections influence each other. As a result, problems such as injecting fuel too rapidly within a given injection event and/or allowing fuel to be injected beyond a desired stopping point can adversely affect emission outputs and fuel economy.

In a system in which multiple injections and different injection rate waveforms are achievable, it is desirable to control and deliver any number of separate fuel injections to a particular cylinder so as to minimize emissions and fuel consumption based upon the operating conditions of the engine at that particular point in time. This may include splitting the fuel injection into more than two separate fuel shots during a particular injection event, (e.g., a pilot, main, and anchor injection), varying the fuel quantities in the shots, advancing the pilot shot during the injection event, and adjusting the timing between the various multiple fuel injections in order to achieve minimal emissions and desired fuel consumption. In some situations, it is also desirable to rate shape the front end of the fuel delivery to the cylinder to control the burn characteristics of the particular fuel being utilized.

When an injection event includes three distinct fuel injection shots, the delays between the individual fuel shots can become so short that the injection device does not have time to fully close during the delay period, and because the injection device is not completely closed when the subsequent fuel injection shot is supposed to begin, the amount of fuel actually injected deviates from the desired amount of fuel to be injected by a significant amount, e.g. as much as 30 cubic mils in some embodiments. This excess amount of fuel may adversely affect the efficiency and emissions benefits anticipated from the original fuel split.

Accordingly, the present invention is directed to overcoming one or more of the problems as set forth above.

DISCLOSURE OF THE INVENTION

In one aspect of the present invention, there is disclosed an electronically controlled fuel injection system which is capable of delivering multiple separate fuel injections to a particular cylinder of an internal combustion engine during a single injection event. The system includes at least one fuel injection device operable to deliver a plurality of fuel injection shots and a controller which is operable to determine a desired anchor duration based on a total main and anchor fuel quantity, a main shot duration, an anchor delay, and a rail pressure if the main and anchor fuel shots are closely coupled in time. Basing the anchor duration on these four variables achieves the injection of the desired fuel amount even when a boot condition occurs.

In a preferred embodiment, the controller is operable to determine that when both a main fuel shot and an anchor fuel shot are desired, then the main duration and the anchor delay may be determined by looking up these values in lookup tables or maps which use engine speed and load/fuel as factors in determining the appropriate main duration and anchor delay. The rail pressure is simply a reading taken from the rail manifold by a sensor, and the total main and anchor fuel quantity is found by subtracting a pilot shot fuel amount, if any, from the governor fuel output, also referred to as the total desired fuel quantity, or the total available fuel quantity, as requested by the governor. Before determining the anchor duration as a function of the five dimensional map, the program preferably confirms the occurrence of a triggering condition. In the illustrated preferred embodiment, a main shot fuel amount is compared with a minimum main shot fuel amount to determine if the main shot fuel amount is less than or equal to the minimum. If the main shot fuel amount is less than the minimum, then the anchor duration is set as a function of the four variables. Otherwise, control is returned to a main program.

In another aspect of the present invention, a computer readable medium contains instructions for controlling the fuel injection control system to set the anchor duration. The instructions determine four variables: rail pressure, total main and anchor fuel quantity, main shot duration, and anchor delay. The anchor duration is then determined based on those four variables.

In a preferred embodiment, the instructions determine the occurrence of a triggering condition. If the triggering condition has not occurred, program control is returned to a main program. If the triggering condition has occurred, then the anchor duration is determined via a five dimensional table or map using rail pressure, total main and anchor fuel quantity, main shot duration, and anchor delay as variables. Preferably, the triggering condition is when the main shot fuel amount is less than or equal to a minimum fuel amount, and a nonzero anchor fuel quantity is specified. In the preferred embodiment, the minimum main shot fuel amount can be set to a desired value. Alternatively, the minimum main shot fuel amount can be determined from a table or map as a function of engine speed and load/fuel. Thus, the minimum main shot fuel amount and a nonzero anchor fuel quantity provides a threshold for entry into a boot condition in which two closely coupled fuel injection shots lose their separate identity by running together. In one embodiment, the minimum main fuel amount is determined in a manner to be indicative of the threshold between a boot and a split injection, wherein, more fuel is generally injected in a boot condition that a split condition.

In still another aspect of the present invention, a method is described for controlling a fuel injection control system to determine an anchor duration. The method comprises sensing and transmitting a rail pressure to the controller, and determining a total main and anchor fuel quantity, a main shot duration and an anchor delay. The anchor duration is then determined based on the total main and anchor fuel quantity, main shot duration, anchor delay, and rail pressure. An injection signal indicative of the respective fuel shots including the anchor duration is then transmitted from an electronic controller to an injector.

In the preferred embodiment, the method includes determining the occurrence of a triggering condition and upon such occurrence, determining the anchor duration based on the total main anchor fuel quantity, main shot duration, anchor delay, and rail pressure. Upon the non-occurrence of the triggering condition, control is returned to a main program.

BRIEF DESCRIPTION OF THE DRAWINGS

For a better understanding of the present invention, reference may be made to the accompanying drawings in which:

FIG. 3 is a schematic diagram of an exemplary current waveform and corresponding fuel waveform for a main shot and anchor shot injection event;

FIG. 4 is a schematic block diagram illustrating determination of an anchor duration; and FIG. 5 is a chart illustrating an example of the injection strategies for steady state emissions taken at certain engine operating conditions based upon engine speed and engine load.

BEST MODE FOR CARRYING OUT THE INVENTION

Figure 1:
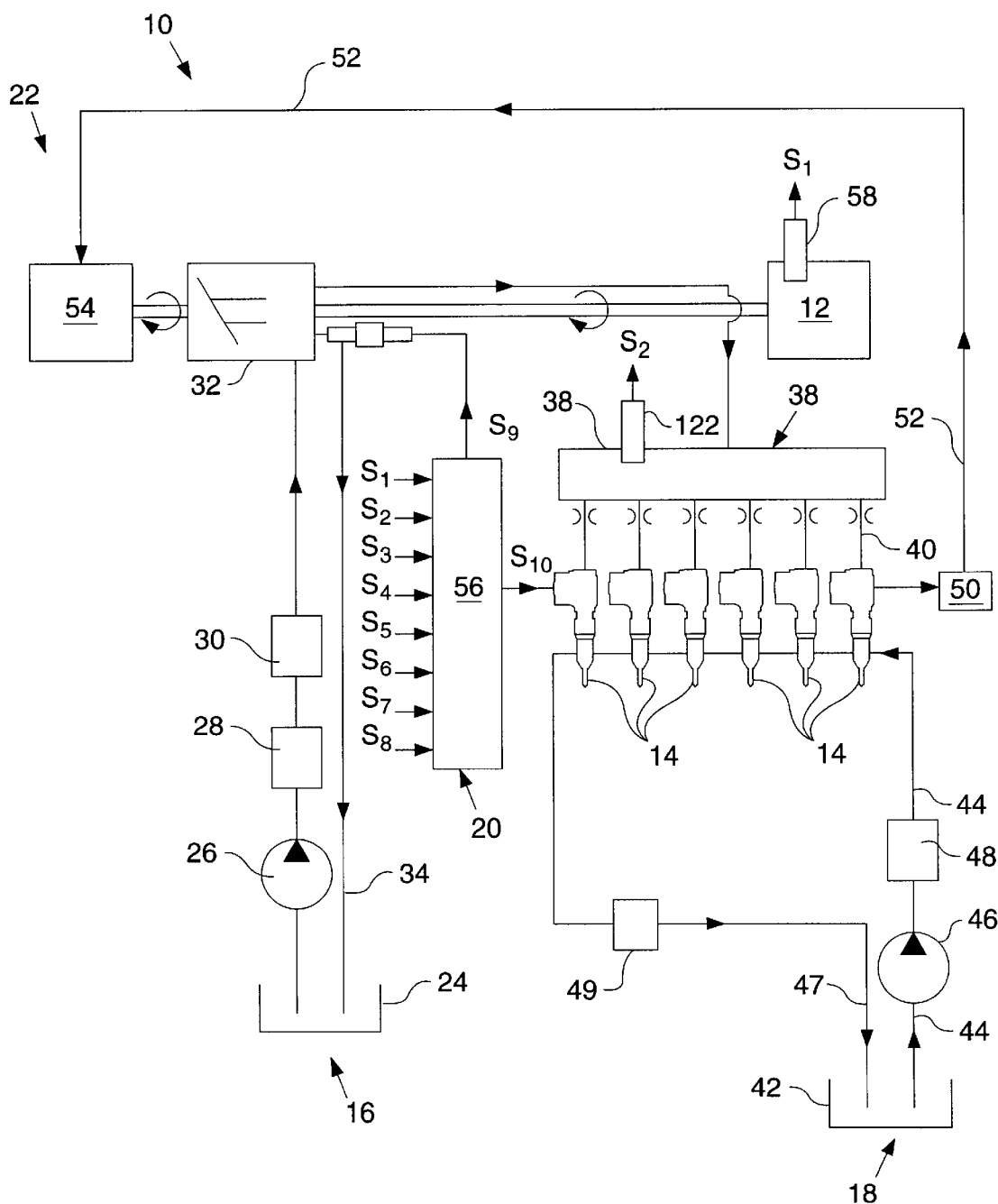
FIG. 1 is a typical schematic view of an electronically controlled injector fuel system used in connection with one embodiment of the present invention.

Referring to FIG. 1, there is shown one embodiment of a hydraulically actuated electronically controlled fuel injection system 10 in an exemplary configuration as adapted for a direct-injection compression ignition engine 12. Fuel system 10 includes one or more electronically controlled fuel injection devices, such as a fuel injector 14, which are adapted to be positioned in a respective cylinder head bore of the engine 12. While the embodiment of FIG. 1 applies to an in-line six cylinder engine, it is recognized and anticipated, and it is to be understood, that the present invention is also equally applicable to other types of engines such as V-type engines and rotary engines, and that the engine may contain any plurality of cylinders or combustion chambers. In addition, while the embodiment of FIG. 1 also illustrates a hydraulically actuated electronically controlled fuel injector system, it is likewise recognized and anticipated that the present invention is also equally applicable to other types of fuel injection devices, including electronically controlled injectors, mechanically actuated electronically controlled injector units as well as fluid activated common rail type fuel injection systems and digitally controlled fuel injection valves.

The fuel system 10 of FIG. 1 includes an apparatus or means 16 for supplying actuation fluid to each injector 14, an apparatus or means 18 for supplying fuel to each injector, electronic control means 20 for controlling the fuel injection system including the manner and frequency in which fuel is injected by the injectors 14 including timing, number of injections per injection event, fuel quantity per injection, time delay between each injection, and the injection profile. The system may also include apparatus or means 22 for recirculating fluid and/or recovering hydraulic energy from the actuation fluid leaving each injector 14.

The actuating fluid supply means 16 preferably includes an actuating fluid sump or reservoir 24, a relatively low pressure actuating fluid transfer pump 26, an actuating fluid cooler 28, one or more actuation fluid filters 30, a high pressure pump 32 for generating relatively high pressure in the actuation fluid, and at least one relatively high pressure actuation fluid manifold 36. A common rail passage 38 is arranged in fluid communication with the outlet from the relatively high pressure actuation fluid pump 32. A rail branch passage 40 connects the actuation fluid inlet of each injector 14 to the high pressure common rail passage 38. In the case of a mechanically actuated electronically controlled injector, manifold or rail 36, common rail passage 38 and branch passages 40 would typically be replaced with some type of cam actuating arrangement or other mechanical means for actuating such injectors. Examples of a mechanically actuated electronically controlled fuel injector unit are disclosed in U.S. Pat. Nos. 5,947,380 and 5,407,131. In the preferred embodiment, the injection device is a fuel injector, but there may be a digitally controlled fuel valve associated with a common rail fuel system.

Apparatus 22 may include a waste accumulating fluid control valve 50 for each injector, a common recirculation line 52, and a hydraulic motor 54 connected between the actuating fluid pump 32 and recirculation line 52. Actuation fluid leaving an actuation fluid drain of each injector 14 would enter the recirculation line 52 that carries such fluid to the hydraulic energy recirculating or recovering means 22. A portion of the recirculated actuation fluid is channeled to high pressure actuation fluid pump 32 and another portion is returned to actuation fluid sump 24 via recirculation line 34.

In a preferred embodiment, the actuation fluid is engine lubricating oil and the actuating fluid sump 24 is an engine lubrication oil sump. This allows the fuel injection system to be connected as a parasitic subsystem to the engine's lubricating oil circulation system. Alternatively, the actuating fluid could be fuel.

The fuel supply means 18 preferably includes a fuel tank 42, a fuel supply passage 44 arranged in fluid communication between the fuel tank 42 and the fuel inlet of each injector 14, a relatively low pressure fuel transfer pump 46, one or more fuel filters 48, a fuel supply regulating valve 49, and a fuel circulation and return passage 47 arranged in fluid communication between each injector 14 and fuel tank 42.

Electronic control means 20 preferably includes a controller, specifically an electronic control module (ECM) 56, the general use of which is well known in the art. ECM 56 typically includes processing means such as a microcontroller or microprocessor, a governor such as a proportional integral derivative (PID) controller for regulating engine speed, and circuitry including input/output circuitry, power supply circuitry, signal conditioning circuitry, solenoid driver circuitry, analog circuits and/or programmed logic arrays as well as associated memory. The memory is connected to the microcontroller or microprocessor and stores instruction sets, maps, lookup tables, variables, and more. ECM 56 may be used to control many aspects of fuel injection including (1) the fuel injection timing, (2) the total fuel injection quantity during an injection event, (3) the fuel injection pressure, (4) the number of separate injections or fuel shots during each injection event, (5) the time intervals between the separate injections or fuel shots, (6) the time duration of each injection or fuel shot, (7) the fuel quantity associated with each injection event, (8) the actuation fluid pressure, (9) current level of the injector waveform, and (10) any combination of the above parameters. Each of such parameters are variably controllable independent of engine speed and load. ECM 56 receives a plurality of sensor input signals $S_1$–$S_8$ which correspond to known sensor inputs such as engine operating conditions including engine speed, engine temperature, pressure of the actuation fluid, cylinder piston position and so forth that are used to determine the precise combination of injection parameters for a subsequent injection event.

For example, an engine temperature sensor 58 is illustrated in FIG. 1 connected to engine 12. In one embodiment, the engine temperature sensor includes an engine oil temperature sensor. However, an engine coolant temperature sensor can also be used to detect the engine temperature. The engine temperature sensor 58 produces a signal designated by $S_1$ in FIG. 1 and is inputted to ECM 56 over line $S_1$. In the particular example illustrated in FIG. 1, ECM 56 issues control signal $S_9$ to control the actuation fluid pressure from pump 32 and a fuel injection signal $S_{10}$ to energize a solenoid or other electrical actuating device within each fuel injector thereby controlling fuel control valves within each injector 14 and causing fuel to be injected into each corresponding engine cylinder. Each of the injection parameters are variably controllable, independent of engine speed and load. In the case of the fuel injectors 14, control signal $S_{10}$ is a fuel injection signal that is an ECM commanded current to the injector solenoid or other electrical actuator.

Figure 2:
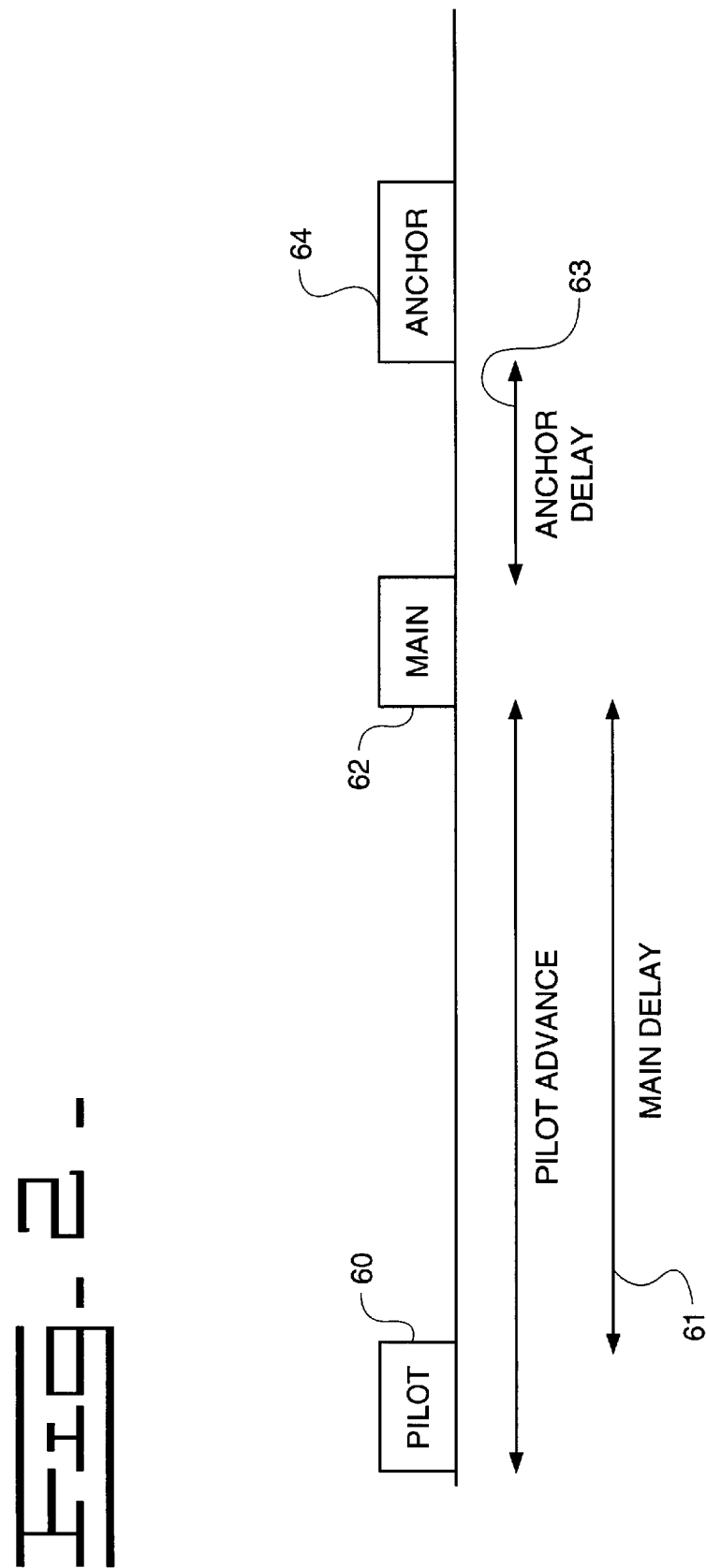
FIG. 2 is a schematic profile of a three shot fuel injection event.

It is recognized that the type of fuel injection desired during any particular fuel injection event will typically vary depending upon various engine operating conditions. In an effort to improve emissions and fuel consumption, it has been found that delivering multiple (two or more) separate fuel injections to a particular cylinder during a fuel injection event at certain engine operating conditions may achieve both desired engine operation as well as emissions control. FIG. 2 illustrates a multiple injection including three separate fuel injections, namely, a first fuel injection or pilot shot 60, a second fuel injection or main shot 62, and a third fuel injection or anchor shot 64. As illustrated in FIG. 2, the pilot shot 60 is injected into the combustion chamber in advance of the main shot 62 by some determined time factor, crank angle or main delay 61, and the anchor shot is sequenced after the main shot 62 based upon a determined time factor, crank angle or anchor delay 63. The main delay and anchor delay may be referred to as injection delays. Based upon programming associated with electronic controller 56 as well as a variety of different maps and/or lookup tables stored within the memory of controller 56 including maps and/or tables relating to engine speed, engine load, the pressure associated with rail passage 38 (rail pressure), desired total fuel quantity and other parameters, controller 56 will be able to dynamically determine the appropriate number of fuel shots, the quantity of fuel required for each fuel shot 60, 62 and 64 and partition the same accordingly, and it will be able to determine the timing and duration of each individual shot as well as the delays between the shots, e.g., the anchor delay 63. In the three shot multiple injection depicted in FIG. 2, a portion of the total fuel to be delivered to the combustion chamber will be injected by the pilot shot 60, a portion of such total fuel will be injected by the main shot 62, and the remaining portion of the total fuel to be injected will be injected by the anchor shot 64. A three shot multiple fuel injection has provided advantages in terms of exhaust emissions, including reduced particulate emissions and/or reduced $NO_x$ emissions as well as desired engine performance at many engine operating conditions as will be hereinafter further explained.

FIG. 3 is an illustration of one embodiment of an injection signal and a corresponding fuel injection event. Referring to FIG. 3, when injection signals are sent to an injector, the injector responds by opening and closing as directed. An exemplary current signal 100 illustrating a current command for injecting a main shot 102 and an anchor shot 104 is depicted in the upper portion of FIG. 3. This current signal or waveform 100 has a distinct split injection command, including an anchor delay associated therewith and shown as region C between the main shot 102 and the anchor shot 104. Region A corresponds to the duration of the main shot 102, and region B corresponds to the duration of the anchor shot 104. A resulting exemplary fuel waveform 106 corresponding to the current waveform 100 is illustrated in the lower portion of FIG. 3. Because the injector 14 does not react instantaneously to the current signals, the injector valve stays open after a current pulse is terminated, and if the anchor delay C is sufficiently short, the start of the next current signal or pulse is received before the injector valve is fully closed. When the anchor delay C is sufficiently short, and when the main duration is of sufficiently short duration, a condition known as a boot condition is produced. While the current signal 100 or pulse represents a split condition such as the split (region C) between the main and anchor current pulses 102 and 104 (FIG. 3), the actual fuel injection is substantially continuous throughout the two shots representing the boot condition as shown in the fuel waveform 106 illustrated in FIG. 3. When a boot condition occurs, if it was not the desired fuel delivery method, then the actual fuel injected can deviate from the desired amount of fuel thereby diminishing engine efficiency and causing excess emissions. A boot type fuel delivery generates a different quantity of fuel and delivers a higher quantity of fuel earlier in the injection sequence, as compared to a split type fuel delivery since, in a boot type delivery or condition, the fuel injection flow rate does not go to zero between the respective shots. Conversely, in a spit fuel delivery due in part to a larger delay C between the end of the main injection and the beginning of the anchor injection, the fuel injection flow rate does go to zero between the respective fuel shots. As a result, in general, more fuel is delivered, and delivered earlier in the injection sequence, in a boot condition as compared to a true split fuel injection condition.

Referring to FIG. 4, a program provided on a computer readable medium is utilized to determine the anchor duration needed when a boot condition actually occurs or is predicted to occur so that the desired amount of fuel is still delivered to the engine. Thus, the program dynamically predicts if a boot or a split will occur, and reacts accordingly. The computer readable medium can comprise any memory but is preferably provided by the ECM/controller 56. Further, the controller 56 is operable to generate control and injection signals $S_{10}$ for transmission through a computer readable data transmission medium, which can be placed in communication with a diagnostic design display and input apparatus (not shown) including a display and keypad. A program start and return location is identified at 108.

As indicated above, the fuel injection system 10 preferably provides two or more shots in each injection event. Thus, to determine the anchor duration, the program determines the total desired fuel quantity as a function of speed and load, a main shot fuel quantity, an anchor shot fuel quantity, and the pilot shot fuel amount at step 110. The pilot shot fuel amount is determined in another routine of the main program, or it can be found in a lookup table or map. FIG. 5 illustrates one embodiment of a fuel injection strategy. That is, for a given speed and a given load, the map illustrated in FIG. 5 may be utilized to determine the desired number of shots, desired fuel quantity for the shots, and the desired timing of the shots. The map illustrated in FIG. 5 may be utilized to determine the pilot shot fuel quantity. The map may be empirically determined. Additionally, the pilot shot fuel amount can be zero if there is no pilot shot designated for the particular fuel injection segment based upon current engine operating conditions. Having determined the pilot shot fuel amount, in step 112, the controller sets a total main and anchor shot fuel quantity to a difference of the governor fuel output or total desired fuel quantity less the pilot shot fuel amount. In other words, since the two fuel shots are closely coupled, the total fuel for both shots is initially considered as a single event. At step 114, a desired main shot fuel amount is determined, and a minimum main shot fuel amount is established based on observed engine performance. In one embodiment, the desired main shot fuel amount may be determined utilizing a map similar to the one illustrated in FIG. 5.

The minimum main shot fuel amount can be set at a preferred value such as approximately 12 cubic mils, or it can likewise be obtained from a lookup table or map as a function of engine speed and load/fuel. The preferred value or map is set by observing where boot conditions actually occur. Thus, the minimum or threshold value allows the program to predict when a boot condition will occur and react accordingly. At step 116, the desired main shot fuel amount is compared to the minimum main shot fuel amount to determine if the desired main shot fuel amount is less than or equal to the minimum. If the desired main shot fuel amount is greater than the minimum, control is returned to the calling function or to the main program for further determination of injection variables. If the main shot fuel amount is less than or equal to the minimum, and the anchor shot fuel quantity is non-zero, then the program proceeds forward to determine the main duration and the anchor delay at step 118. Thus, the desired main shot fuel amount being less than or equal to the minimum along with a nonzero anchor fuel quantity is a triggering condition that indicates whether a boot condition will likely occur. The triggering condition is preferably checked before the anchor duration will be set for an expected boot condition. Thus, the desired main shot fuel amount is determined prior to determining anchor duration. Other conditions can also be used for the triggering condition. For example, the anchor delay can be compared to a minimum anchor delay, and if the anchor delay is less than or equal to the minimum anchor delay, then the program would determine the anchor duration based upon an expected boot condition. Thus, the controller 56 is operable to check for the occurrence of a triggering condition before setting the anchor duration for an expected boot condition. Put differently, the program determines or predicts the occurrence of a boot condition and determines the anchor duration based on that prediction or lack thereof.

In determining the main duration and the anchor delay in step 118, the program looks up the main duration and anchor delay in lookup tables or maps using engine speed and load as factors in determining the main duration and anchor delay. At some time, the rail pressure is sensed at 120 by sensor 122 (FIG. 1) and transmitted to the controller 56 in a signal indicative of the rail pressure which controls the fuel injection rate. Preferably, the rail pressure is sensed every 15 milliseconds, or at the start of current of the main shot, whichever is the shorter interval in time. Having determined the rail pressure, main duration, and anchor delay, and having confirmed the occurrence of a triggering condition which is indicative of whether a boot or split condition will occur (step 116), the program determines the anchor duration at step 124. Determining the anchor duration preferably comprises looking up the duration in a lookup table or map stored in memory. This lookup table or map is preferably a five-dimensional table or map using the rail pressure, total main and anchor fuel quantity, main duration, and anchor delay as factors in finding the desired anchor duration to achieve injection of the desired fuel amount in the main and anchor shots during a boot condition, or when two injection events are closely coupled to each other. In this regard, it is also recognized and anticipated that the operational tables or maps referenced herein could take the form of two or three dimensional tables or maps where specific parameters such as anchor delay, rail pressure, engine speed, engine load, main shot duration and so forth are held constant for certain groups of tables or maps. Other variations and configurations of the required tables and maps are likewise recognized and envisioned. Thus, the present invention enhances engine efficiency and reduces emissions by dynamically determining the occurrence of a boot condition and dynamically setting the anchor duration based on four other variables to account for the occurrence of boot conditions.

Industrial Applicability

Utilization of an injection method and system in accordance with the present invention provides for better emission control during certain engine operating conditions as explained above. Although the particular injection waveform for delivering multiple fuel injections may vary depending upon the particular engine operating conditions, the present system is capable of determining the timing associated with each individual injection event, the number of fuel injection shots per injection event, the duration of each fuel shot, any delays between the fuel shots, the occurrence of and compensation for a boot condition between closely coupled fuel shots, and the displacement of the cylinder piston relative to the beginning of each injection event regardless of the type of electronically controlled fuel injection device being utilized, regardless of the type of engine being utilized, and regardless of the type of fuel being utilized. In this regard, appropriate fuel maps relating rail pressure, engine speed, engine load, pilot/main/anchor duration times, pilot/main/anchor fuel quantities, anchor timing delay, minimum pilot/main/anchor fuel quantities, and other parameters can be stored or otherwise programmed into ECM 56 for use during all operating conditions of the engine. Some of the parameters and values associated with the operational maps identified herein may come from accumulated statistical data acquired from the performance history of similar injectors, engines, and similar operating conditions. These operational maps, tables and/or mathematical equations stored in the ECM programmable memory determine and control the various parameters associated with the appropriate multiple injection events to achieve optimum emissions control.

It is also recognized that the particular ambient conditions under which the engine will be operating will effect the amount of emissions produced by the engine. As the ambient conditions change, so will the engine exhaust emissions. As a result, the multiple fuel injection events may have to be dynamically adjusted in order to keep the engine emissions within acceptable limits based upon ambient conditions. These adjustments may include adjustments to the pilot injection timing and quantity, the main injection timing and quantity, the delay between the pilot and main injections, and the delay between the main and anchor injections. Appropriate sensors coupled with the ECM 56 can monitor these and other ambient conditions.

Although fuel system 10 illustrated in FIG. 1 has been shown as a representative six injector system, it is recognized that the present invention could be incorporated into fuel injection systems including any number of fuel injectors as well as a wide variety of different types of electronically controlled fuel injectors, or digitally controlled fuel valves. It is also recognizes that variations to the steps depicted in the flowchart of FIG. 4 could be made without departing from the spirit and scope of the present invention. In particular, steps could be added or some steps could be eliminated. All such variations are intended to be covered by the present invention.

As is evident from the forgoing description, certain aspects of the present invention are not limited by the particular details of the examples illustrated herein and it is therefore contemplated that other modifications and applications, or equivalence thereof, will occur to those skilled in the art. It is accordingly intended that the claims shall cover all such modifications and applications that do not depart from the spirit and scope of the present invention.

Other aspects, objects and advantages of the present invention can be obtained from a study of the drawings, the disclosure and the appended claims.

What is claimed is:

1. A fuel injection control system for partitioning a governor fuel output into separate fuel quantities and to determine an anchor duration comprising:
    at least one fuel injecting device operable to deliver a plurality of fuel injection shots including a main shot and an anchor shot;
    an electronic controller coupled to the at least one fuel injecting device;
    at least one sensor operable to sense a rail pressure and transmit a signal indicative of the rail pressure to the controller;
    the controller being operable to determine a total main and anchor fuel quantity, a main shot duration, and an anchor delay; and
    the controller being operable to determine the anchor duration based on the total main and anchor fuel quantity, the main shot duration, the anchor delay, and the rail pressure.

2. The fuel injection control system according to claim 1 wherein determining the anchor duration comprises looking up the anchor duration in a five-dimensional map.

3. The fuel injection control system according to claim 1 further comprising the controller being operable to determine a main shot fuel amount and if the main shot fuel amount is greater than approximately 12 cubic mils return control to a main program.

4. The fuel injection control system according to claim 1 further comprising the controller being operable to determine a desired main shot fuel amount and if the main shot fuel amount is less than approximately 12 cubic mils determine the anchor duration based on the total main and anchor fuel quantity, the main shot duration, the anchor delay, and the rail pressure.

5. The fuel injection control system according to claim 1 further comprising the controller being operable to send an injection signal to the at least one fuel injecting device, and the fuel injecting device thereafter injecting the main shot and the anchor shot so that a boot condition occurs between the main shot and the anchor shot.

6. The fuel injection control system according to claim 1 further comprising the controller being operable to determine a minimum main shot fuel amount, to compare the minimum main shot fuel amount with a main shot fuel amount, and if the main shot fuel amount is less than or equal to the minimum main shot fuel amount and if the anchor fuel quantity is nonzero, to determine the anchor duration based on the total main and anchor fuel quantity, the main shot duration, the anchor delay, and the rail pressure.

7. The fuel injection control system according to claim 6 wherein determining the minimum main shot fuel amount comprises looking up the minimum main shot fuel amount in a lookup map.

8. The fuel injection control system according to claim 1 wherein determining the main shot duration and the anchor delay comprises looking up the main shot duration and the anchor delay in a lookup map.

9. The fuel injection control system according to claim 1 wherein determining the total main and anchor fuel quantity comprises subtracting a pilot fuel amount from the governor fuel output.

10. A computer readable medium containing instructions for controlling a fuel injection control system to partition a governor fuel output into separate fuel quantities and determine an anchor duration comprising:

sensing a rail pressure;

transmitting a signal indicative of the rail pressure to the controller;

determining a total main and anchor fuel quantity;

determining a main shot duration and an anchor delay; and determining the anchor duration based on the total main and anchor fuel quantity, the main shot duration, the anchor delay, and the rail pressure.

11. The computer readable medium according to claim 10 further comprising determining a pilot shot fuel amount and wherein determining the total main and anchor fuel quantity comprises subtracting the pilot shot fuel amount from the governor fuel output.

12. The computer readable medium according to claim 10 wherein determining the anchor duration comprises looking up the anchor duration in a lookup map using total main and anchor fuel quantity, rail pressure, main duration, and anchor delay as factors for determining the anchor duration.

13. The computer readable medium according to claim 10 further comprising determining the occurrence of a triggering condition upon which occurrence the anchor duration is determined based on the total main and anchor fuel quantity, the main shot duration, the anchor delay, and the rail pressure.

14. The computer readable medium according to claim 13 wherein determining the occurrence of a triggering condition comprises determining if a main shot fuel amount is less than or equal to a minimum main shot fuel amount.

15. A method for controlling a fuel injection control system to partition a governor fuel output into separate fuel quantities and determine an anchor duration comprising:

sensing a rail pressure;

transmitting a signal indicative of the rail pressure to the controller;

determining a total main and anchor fuel quantity;

determining a main shot duration and an anchor delay;

determining the anchor duration based on the total main and anchor fuel quantity, the main shot duration, the anchor delay, and the rail pressure; and transmitting an injection signal indicative of at least the main and anchor durations.

16. The method according to claim 15 further comprising determining a pilot shot fuel amount and wherein determining the total main and anchor fuel quantity comprises subtracting the pilot shot fuel amount from the governor fuel output.

17. The method according to claim 15 further comprising determining the occurrence of a triggering condition upon which occurrence the anchor duration is determined based on the total main and anchor fuel quantity, the main shot duration, the anchor delay, and the rail pressure.

18. The method according to claim 17 wherein upon the non-occurrence of the triggering condition control is returned to a main program.

19. The method according to claim 17 wherein the triggering condition comprises a main shot fuel amount less than a minimum main shot fuel amount, and a nonzero anchor fuel quantity.

20. The method according to claim 19 further comprising looking up the minimum main shot fuel amount in a lookup map.

21. A fuel injection control system for portioning a governor fuel output into separate fuel quantities and to determine an anchor duration comprising:

at least one fuel injection element operable to deliver a plurality of fuel injection shots;

an electronic controller coupled to the at least one fuel injection element;

the controller being operable to determine a total desired fuel quantity for a fuel injection event having multiple injection shots;

the controller being operable to determine whether a boot condition exists; and the controller being operable to determine the anchor duration in response to the presence and absence of the boot condition.

22. The fuel injection control system according to claim 21 wherein determining the anchor duration comprises looking up the anchor duration in a five-dimensional map.

23. The fuel injection control system according to claim 21 wherein determining whether the boot condition exists comprises determining whether a threshold has been met.

24. The fuel injection control system according to claim 23 wherein the threshold comprises a minimum main shot fuel amount, and the presence of a nonzero anchor fuel quantity.

25. The fuel injection control system according to claim 21 further comprising the controller being operable to determine a minimum main shot fuel amount, to compare the minimum main shot fuel amount with a main shot fuel amount, and if the main shot fuel amount is less than or equal to the minimum main shot fuel amount, and the presence of a nonzero anchor fuel quantity, to determine the anchor duration based on the total main and anchor fuel quantity, the main shot duration, the anchor delay, and the rail pressure.

* * * * *

UNITED STATES PATENT AND TRADEMARK OFFICE
CERTIFICATE OF CORRECTION

PATENT NO.     : 6,415,762 B1
DATED          : July 9, 2002
INVENTOR(S)    : Gregory G. Hafner et al.

It is certified that error appears in the above-identified patent and that said Letters Patent is hereby corrected as shown below:

<u>Title page, Item [54] and Column 1, line 1,</u>
Remove the word "DELIVER" and replace with -- DELIVERY --

Signed and Sealed this

Twenty-sixth Day of November, 2002

*Attest:*

*Attesting Officer*

JAMES E. ROGAN
*Director of the United States Patent and Trademark Office*